United States Patent [19]

Dragotta

[11] 4,207,974

[45] Jun. 17, 1980

[54] VISUAL INSPECTION APPARATUS

[76] Inventor: Peter Dragotta, 4 Bodie Rd., Wayne, N.J. 07470

[21] Appl. No.: 948,771

[22] Filed: Oct. 5, 1978

[51] Int. Cl.² .................. B65G 17/24; B65G 47/24
[52] U.S. Cl. .................... 198/344; 198/377; 198/779; 209/701
[58] Field of Search ............ 198/344, 410, 415, 606, 198/779, 377, 378; 209/522, 540, 545, 701, 705, 938, 526; 356/426, 427, 428

[56] References Cited

U.S. PATENT DOCUMENTS

| | | | |
|---|---|---|---|
| 1,325,527 | 12/1919 | Mingle | 198/377 |
| 2,395,620 | 2/1946 | Fogle | 198/344 X |
| 2,991,687 | 7/1961 | Henebry | 198/344 X |
| 3,101,836 | 8/1963 | Rountree | 198/377 |
| 3,216,550 | 11/1965 | Cox | 198/377 |

FOREIGN PATENT DOCUMENTS

| | | | |
|---|---|---|---|
| 2643511 | 4/1978 | Fed. Rep. of Germany | 198/377 |
| 498223 | 1/1976 | U.S.S.R. | 198/779 |

*Primary Examiner*—James L. Rowland
*Attorney, Agent, or Firm*—Norman N. Popper; Daniel H. Bobis

[57] ABSTRACT

A visual inspection apparatus wherein a plurality of rollers conveying articles to be inspected are driven linearly at one rate of speed and the rollers are rotated at a pre-selected rate of rotation, infinitely variable at an inspection station, by frictional contact with a loop moving at a controlled rate of speed.

6 Claims, 7 Drawing Figures

VISUAL INSPECTION APPARATUS

BACKGROUND OF THE INVENTION

1. Field of Invention

This invention relates generally to a visual inspection apparatus wherein articles to be inspected are conveyed before an inspector and specifically to such a visual inspection apparatus wherein the articles to be inspected are displayed before an inspector and revolved at an independently controlled rate of revolution separately controlled from the rate of linear movement.

2. Prior Art

Inspection apparatus for displaying generally cylindrical objects have been devised and found useful to provide for the inspection of beverage bottles to determine whether they have been properly cleaned, whether they have been properly filled, whether unwanted debris is enclosed in them, whether the contents are of desired clarity and color and free of visual contamination. In such devices, a conveyor means passes before the eyes of the inspector, usually with a light opposite the inspector which light shines through the objects to be inspected as they are conveyed across the line of sight of the inspector. The movement of the items to be inspected (usually bottles) may be controlled as to the rate at which the bottles move before the inspector. Frequently, not only are the items to be inspected caused to move linearly, but they are caused to rotate. The rate of linear movement and the rate of rotational movement is usually such that a particular inspector may find each of the movements too rapid and may become unable to properly inspect the bottles or their contents without slowing down both the linear and the rotational movement which movements are dependent upon each other. In slowing down both the linear and the rotational rate of movement of bottles, the productivity of the inspector is drastically reduced. On the other hand, when the rate of movement is speeded up, the rate of inspection is increased but the efficiency of the inspection may be drastically reduced due to the capacity of the inspector. Thus the rate of inspection must necessarily be sacrificed to efficiency of inspection.

SUMMARY OF THE INVENTION

It has been found that the rate of inspection need not be sacrificed to efficiency of inspection. In fact inspection may proceed at a rapid rate if the items to be inspected can be controlled as to their linear movement and separately controlled as to their rotational movement, thereby accommodating the speed of inspection to the capacity of the inspector and effectively displaying the contents of the bottles to be inspected by rotating them rapidly although their linear movement is selectively reduced. This result is achieved by having a conveyor having a number of inspection positions thereon capable of being regulated as to linear speed of conveying which is controlled by one motor and a second motor for controlling selectively the rate of rotation of the items to be inspected by the frictional engagement of rollers on which the items to be inspected rest and are rotated. Thus, available to the inspector is a slower or faster rate of linear movement of items to be inspected, and a slower or faster rate of rotation of items to be inspected which is separately controllable apart from the rate of linear movement.

DRAWINGS

These objects of advantages as well as other objects and advantages may be obtained by the device shown by way of illustration in the drawings in which.

PREFERRED EMBODIMENT

Figure 1:
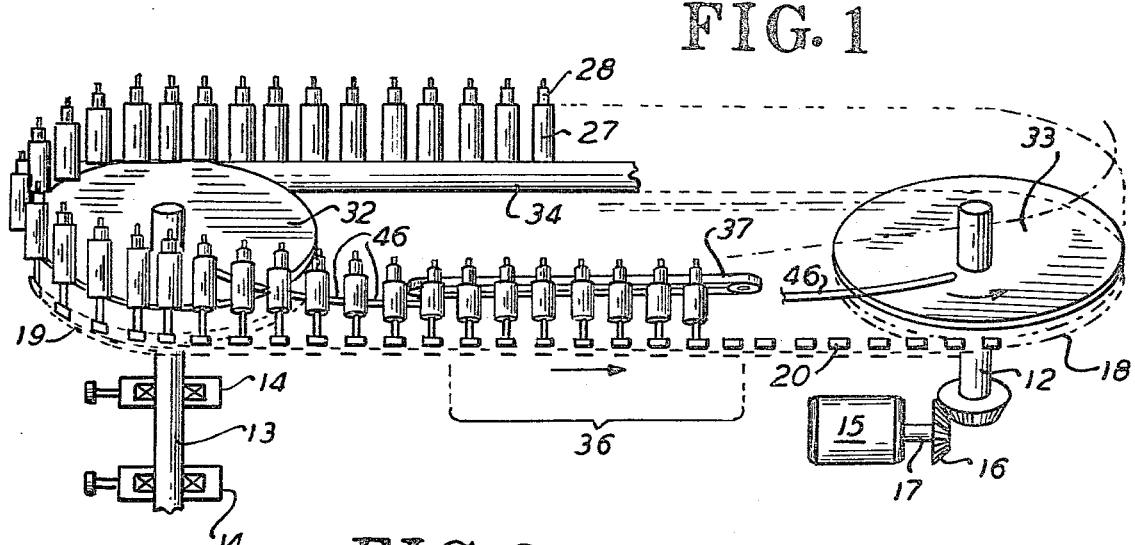
FIG. 1 is a plan view showing the inspection apparatus.
Figure 2:
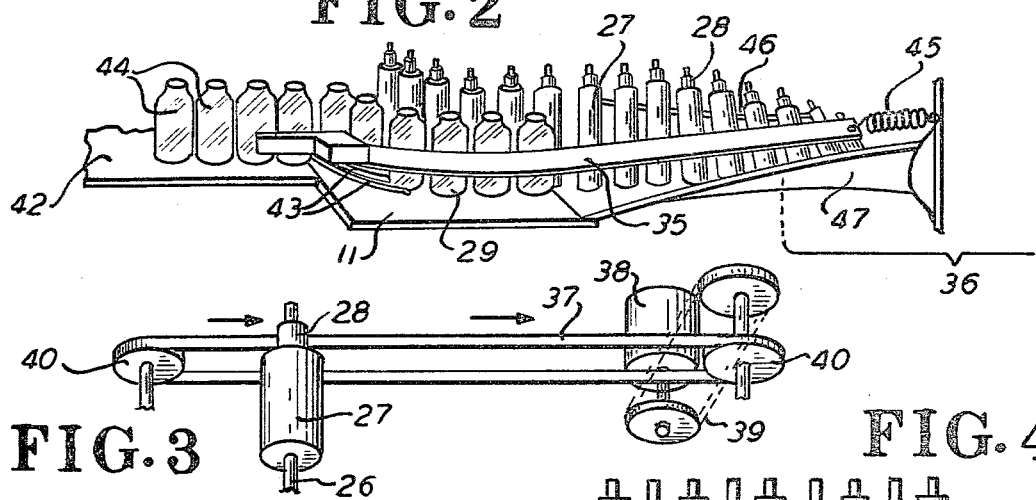
FIG. 2 is a perspective view of the feed or entry end of the apparatus where bottles to be inspected are loaded.
Figures 3, 4:
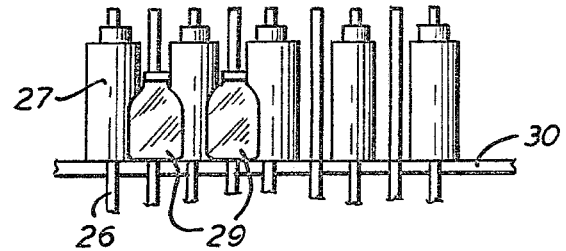
FIG. 3 is a plan view of the drive for rotating spindles at an inspection station independent of the linear movement of the spindles.
FIG. 4 is a partial vertical elevation showing bottles for inspection engaged with large rollers.

The Visual Inspection Apparatus provides a table 11 upon which there is mounted at one end, a driven vertical shaft 12. A similar but undriven vertical shaft 13 is attached to the opposite end of the table 11. A pair of adjustable bearings 14 hold the vertical shaft 13 adjustably at proper tension. The first vertical shaft 12 is driven by a first motor 15 connected to a bevel gear which engages another bevel gear 16 on the first motor's 15 shaft 17. On the top of the table a sprocket 18 is mounted on the first shaft 12 and a similar sprocket 19 is mounted on the second shaft 13. The sprockets carry an endless chain 20, defining the first flexible chain loop.

Figure 5:
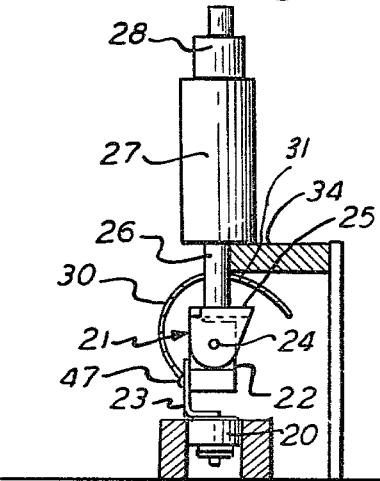
FIG. 5 is a partial vertical sectional view showing an erect spindle.
Figure 6:
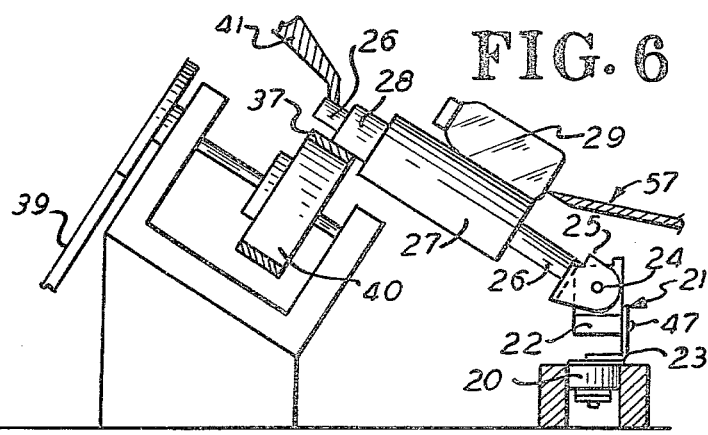
FIG. 6 is a side elevational view showing a supine spindle engaged for rotation with a separately controllable belt.

The chain carries a plurality of pivot-block assemblies 21. Pivot-blocks 22 are rigidly attached to L-shaped brackets 23 on the chain 20 and have a transverse bore through which pivot pins 24 pass. The pivot pins 24 carry pivotable yokes 25 to which there are affixed normally upright spindles 26. The spindles 26 are pivotable with the yokes 25 so that they may be deflected from their generally erect vertical position (shown in FIG. 5) to a generally horizontal, supine position (shown in FIG. 6). Each spindle 26 carries a roller 27 which is freely rotatable on the spindle. At the top of each roller, there is a circular roller or friction sleeve 28. The friction sleeve 28 is made of a material such as rubber or some similar material having a high coefficient of friction. Other rollers 27 of varying diameter may be substituted for mounting on the spindles 26, so that they will be adaptable to engaged articles of different diamaters, such as bottles 29. The chain 20 below the spindle is covered with a protective shroud 30 of rubber (or similar flexible sheet material) to protect the links of the chain from contamination by corrosive liquids or powders. Holes 31 in the shroud 30 permit spindles 26 to extend through the shroud 30. Above the chain 20, there is a bar or guide 46, reaching from the plate 33 above the sprocket 18 to the rear layover belt 37. Similarly, there is a rear layover bar or guide 46 reaching from the plate 32 above the sprocket 13, to the belt 37. These rear layover bars 46, are separated from each other by a gap in the first instance permit the rollers 27 to go into reclining position from erect position to engage and be driven by the belt 37, and in the second instance, serve to guide the rollers 27 up from reclining position, back to erect position and away from driven engagement with the belt 37. The similar plate 33 is mounted on the second vertical shaft 13. Between the plates 32, 33 there also is a guide path 34 to support the rollers continuously upright on their back course. The plates, 32, 33 and the guide path 34, engage the spindles 26 in an erect position, so that they will not tilt until they reach the front inspection course as will be described. This describes the course of the rollers from the discharge end to the entrance position on the apparatus. At the entry (inspection feed) end of the apparatus, when the spindles 26 pass beyond the plate 32 mounted on the first shaft 13, there is a spring loaded front layover bar 35 which urges the spindles 26 to pivot from the erect position (as shown in FIG. 5) to a supine position (nearly horizontal position as shown in FIG. 6) and to carry with them the rollers 27 to a supine position. When the rollers 27 and the spindles 26 have reached to supine position, as shown in FIG. 6, they traverse an inspection area 36, where there is an independently driven endless belt loop 37, disposed to engage the friction sleeves 28 on the rollers 27. This belt 37 is independently driven by a second separate motor 38 connected to a chain 39 which rotates a pulley 40 to drive the friction belt 37. In order to compel firm contact of the friction sleeves 28 with the friction belt 37, there is an elongated pressure pad 41 of deflectable plastic which engages the tips of the spindles 26, thereby forcibly engaging the friction sleeves 28 with the friction belt 37.

It will be seen that the longitudinal speed of movement of the spindles 26 is independent of the speed of rotation of the rollers 27 by reason of the separate motor 38 drive for the friction belt. After the first loop chain 20 leaves the inspection area, a second rear layover bar 46 raises the rollers to return them to an erect position at which point the rollers ride into the plate 33 mounted on the end of the shaft 12 which keeps them in the erect position.

At the entry (feed) end of the apparatus, there is a feed table 42 which introduces bottles 44 or other items to be engaged by the rollers 27. A series of leaf springs 43 ensures that the bottles 44 which are being fed, have firm contact with the rollers 27 so that they are carried by the rollers toward the inspection station 36. The front layover bar 35 compels the bottles 29 (or other items to be inspected) to move by engagement with the rollers. This front layover bar 35 is a strip rigidly attached at one end and suspended by a spring 45 at the other end. The table 42, becomes a ramp curving arcuately upwardly so as to lay over the bottles 29 against the rollers 27, which recline against the rear layover bar 46.

At the discharge end of the inspection station where the spindles 28 are raised from an approximate horizontal supine position to an erect position, there is a similar discharge rear layover bar 46 behind the spindles 28, and a downwardly descending ramp portion of the table 42. This ensures that any bottles 29 or other items being inspected will revert on the down-ramp to a generally erect position from the generally horizontal supine position, that they have at the inspection station 36. A front layover bar 56 governs the position of the bottles 29 on the descending ramp. When the items inspected reach a generally erect position, a discharge plate 51 carries them away from the rollers 27 for collection and packaging.

The rear layover bar 46 permits the rollers 27 to gradually rise from the supine position, and again assume an erect position after leaving the inspection area 36.

By reason of the differential speed by which the rollers on the chain 20 move linearly, driven by the first motor 15 and the controlled differential speed at which they are rotated by the friction collars 28 engaged with the belt 37 driven by the separate second motor 38, items to be inspected may be moved at a controlled rate linearly across the inspection area 36 which rate facilitates their inspection. Such bottles on the rollers may be rotated slowly or rapidly (according to the motor 38), to accommodate the visual inspection skills of the inspector using the apparatus so that a high degree of rotation of bottles 44 to be inspected may be achieved, although the linear rate of movement of the independently controlled rollers 27 is held to a relatively slow rate of linear movement. Linear movement of bottles 44 at the inspection station, and the rotation of such items thus is controllable in two ways, to suit the skills and capacity of the inspector: i.e. first as to linear movement and second as to rotational movement.

In order to prevent the items being inspected from sliding off of the supine rollers 27, a bottom edge support 57 engages the bottom of the inspection items (bottles 29) at the inspection station, in order that they shall not slide off of the rollers 27, but will be kept thereon continuously as the rollers move across the inspection area 36.

Figure 7:
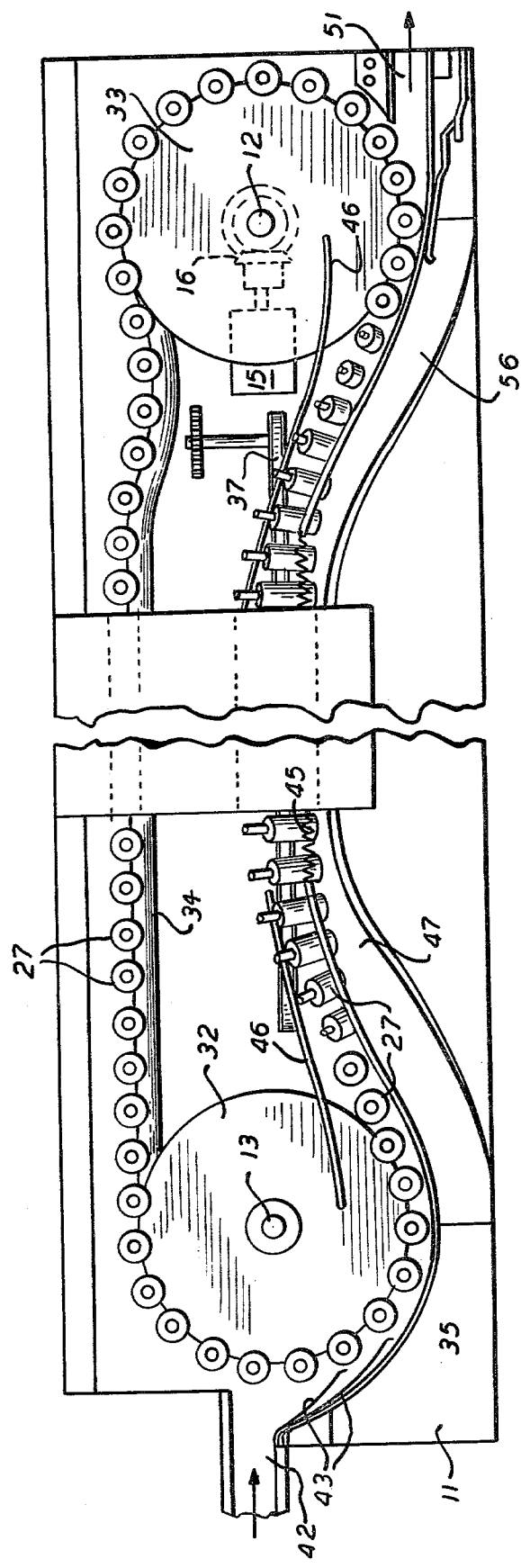
FIG. 7 is a top plan view of the inspection apparatus.

An upwardly disposed track 47 portion (see FIG. 7) of the table 11 encourages bottles 29 to lay over against the rollers 27 as the spindles 26 become supine at the inspection station 36; and a similar, downwardly disposed track portion 56 of the table 11 constituting a tilted exit ramp permits the bottles 29 to revert to erect position as they leave the inspection station 36.

The apparatus is versatile to accommodate items to be inspected, having either small diameter rollers 27 such as one inch in diameter, or large diameter rollers such as two inches in diameter. The standard roller 27 of approximately one inch in diameter is suitable for conveying small items of perhaps one inch in diameter for inspection. However, since each roller 27 is only slid onto each spindle 26, it may readily be removed and substituted by a larger diameter roller, which roller is suitable to accommodate items to be inspected which have a diameter of perhaps two, three or four inches.

The special block 22 mounted on the standard chain is a generally rectangular body that is attached by screws 47 to an upstanding flange 23 on the chain links. This block has a transverse passage to accommodate a pivot pin 24. A yoke 25 carried by the pivot pin serves to mount the spindles 26 deflectably.

What is claimed:
1. A visual inspection apparatus comprising:
   (a) a first, flexible, endless loop,
   (b) a plurality of normally vertically erect spindles pivotably mounted on the loop,
   (c) the spindles disposed in spaced relation to each other sufficiently close that an item disposed thereon for inspection cannot pass between them,
   (d) freely rotatable rollers on the spindles,
   (e) sleeves on the rollers,
   (f) the spindles deflectable from erect to supine position,
   (g) a second, flexible, endless loop positioned to engage the sleeves on the rollers when the spindles are deflected to supine position,

(h) a first means to drive the first loop at a preselected speed, whereby the linear movement of the rollers on the spindles is controlled, (i) a second means to drive the second loop at a preselected speed, whereby engagement of the second loop with the sleeves on the rollers, rotates the rollers at a controlled separate rate of rotation with respect to the rate of linear movement of the rollers as controlled by the first means to drive.

2. A visual inspection apparatus comprising:
(a) the device according to claim 1,
(b) the mounting for the spindles on the first loop comprising
(A) a block attached to the loop,
(B) a bore through the block,
(C) a yoke embracing the block,
(D) a pin passed through the yoke and the bore, whereby the mounting for the spindles is pivotable to permit deflection of the spindle.

3. A visual inspection apparatus comprising:
(a) the device according to claim 1,
(b) the first flexible loop being a chain,
(c) a protective shroud covering the chain to protect it from contamination,
(d) the spindles mounted on the loop extending through the shroud.

4. A visual inspection apparatus comprising:
(a) the device according to claim 1,
(b) means to sustain the spindles erect for a portion of the course traversed by the first flexible loop,
(c) means to deflect the spindles to a supine position at an inspection station portion of the course.

5. A visual inspection apparatus comprising:
(a) the device according to claim 1,
(b) a feed table for delivering articles to be inspected to the rollers,
(c) means for bringing the articles into engagement with the moving rollers,
(d) guide means for sustaining the spindles erect,
(e) a gap in the guide defining an inspection station,
(f) a tilted entrance ramp for tilting the articles into deflecting engagement with the rollers on the deflectable spindle, whereby the spindles are deflected from erect to supine position, at the gap,
(g) a tilted exit ramp for articles in engagement with the deflected spindles, whereby the articles are restored to erect position,
(h) arcuate guides positioned to engage the articles and to lower and raise them from supine and then to erect position.

6. A visual inspection apparatus comprising:
(a) a first, flexible endless loop,
(b) a plurality of normally vertically erect spindles pivotably mounted on the loop,
(c) the spindles disposed in spaced relation to each other sufficiently close that an item disposed thereon for inspection cannot pass between them,
(d) freely rotatable rollers on the spindles,
(e) sleeves on the rollers,
(f) the spindles deflectable from erect to supine position,
(g) a second, flexible, endless loop positioned to engage the sleeves on the rollers when the spindles are deflected to supine position,
(h) a first means to drive the first loop at a preselected speed, whereby the linear movement of the rollers on the spindles is controlled,
(i) a second means to drive the second loop at a preselected speed, whereby engagement of the second loop with the sleeves on the rollers, rotates the rollers at a controlled separate rate of rotation with respect to the rate of linear movement of the rollers as controlled by the first means to drive,
(j) the mounting for the spindles on the first loop comprising,
(A) a block attached to the loop,
(B) a bore through the block,
(C) a yoke embracing the block,
(D) a pin passed through the yoke and the bore, whereby the mounting for the spindles is pivotable to permit deflection of the spindle.

* * * * *